J. H. DEMING.
DIFFERENTIAL COUPLING DEVICE.
APPLICATION FILED OCT. 5, 1912.

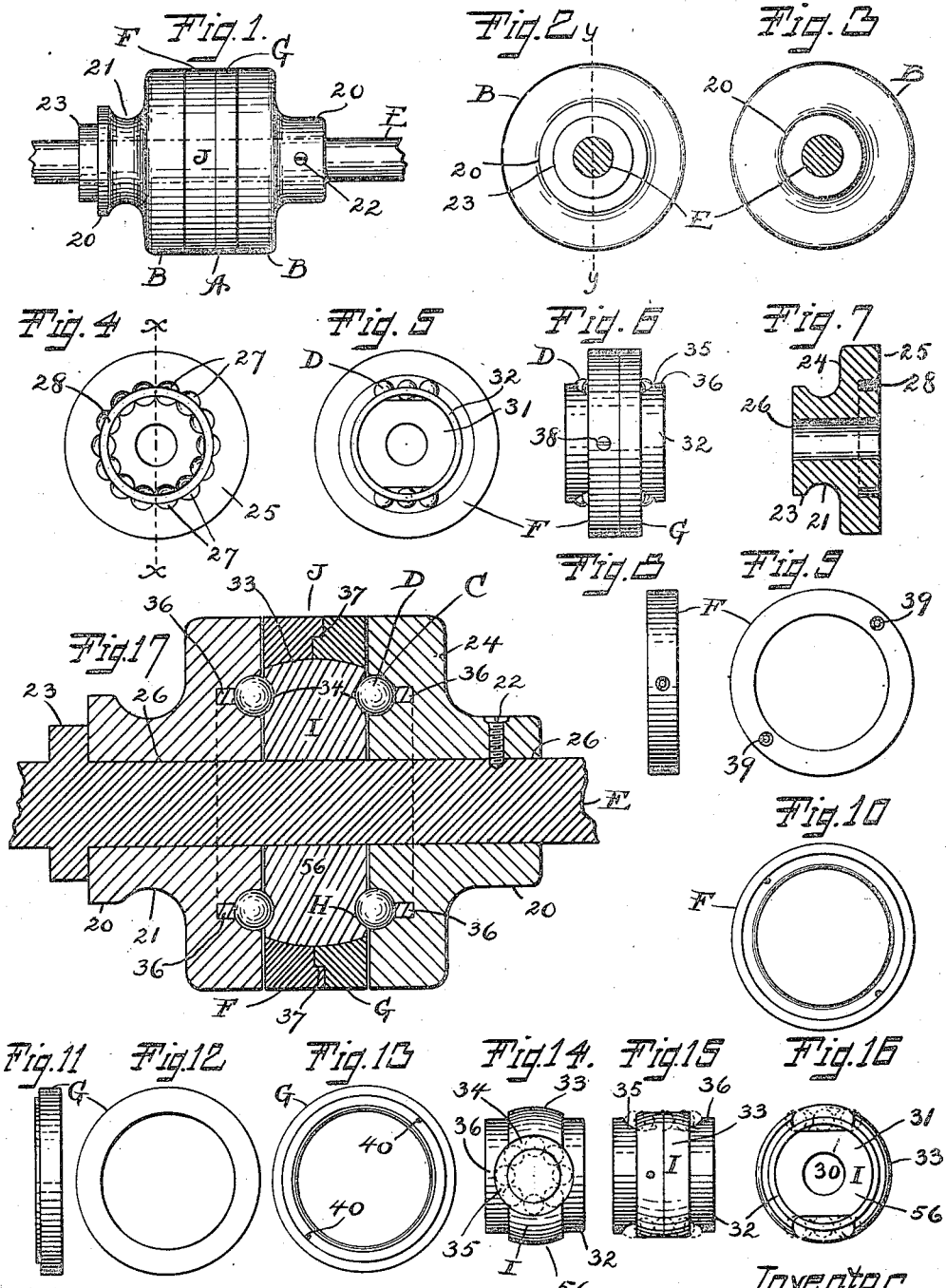
J. H. DEMING.
DIFFERENTIAL COUPLING DEVICE.
APPLICATION FILED OCT. 5, 1912.
1,075,142.
Patented Oct. 7, 1913.
2 SHEETS—SHEET 1.
Witnesses
S. H. Clarke
R. W. Edwards.
Inventor
Joseph H. Deming.
By Louis M. Schmidt
Atty.

1,075,142.

Patented Oct. 7, 1913.
2 SHEETS—SHEET 2.

Witnesses
S. H. Clarke
R. W. Edwards.

Inventor
Joseph H. Deming
By Louis M. Schmidt
Atty.

UNITED STATES PATENT OFFICE.

JOSEPH H. DEMING, OF MIDDLETOWN, CONNECTICUT, ASSIGNOR OF ONE-HALF TO OSCAR NELSON, OF MIDDLETOWN, CONNECTICUT.

DIFFERENTIAL COUPLING DEVICE.

1,075,142.

Specification of Letters Patent.  Patented Oct. 7, 1913.

Application filed October 5, 1912. Serial No. 724,058.

*To all whom it may concern:*

Be it known that I, JOSEPH H. DEMING, a citizen of the United States, residing at Middletown, in the county of Middlesex and State of Connecticut, have invented certain new and useful Improvements in Differential Coupling Devices, of which the following is a specification.

My invention relates to improvements in differential coupling devices, and the object of my improvement is simplicity and economy in construction and convenience and efficiency in use.

Figure 18:
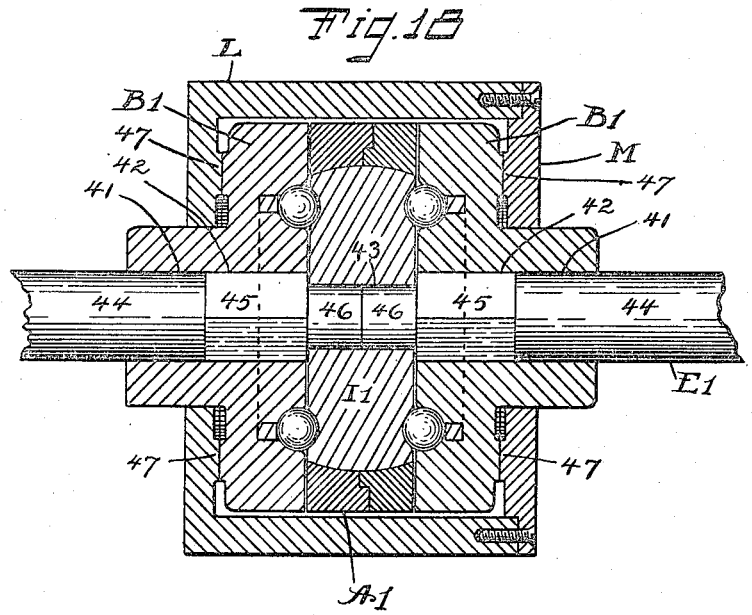
Figure 19:
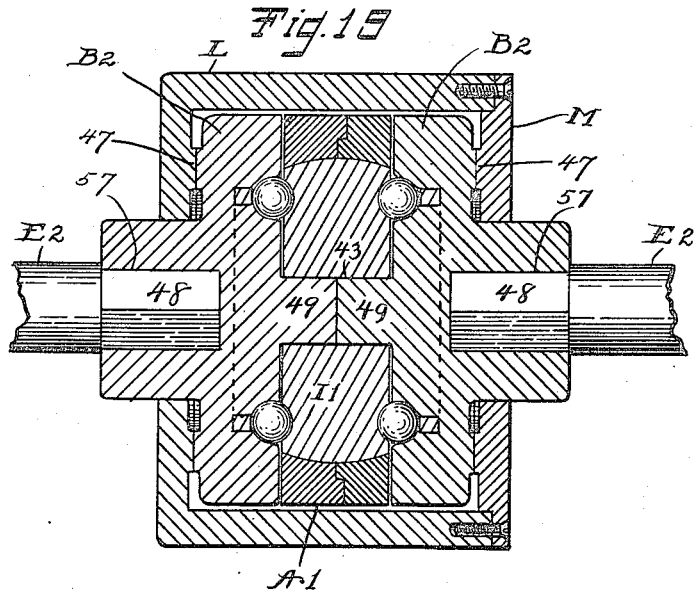

In the accompanying drawing:—Figure 1 is a side elevation of my differential coupling device. Fig. 2 is a view of the left end of the same. Fig. 3 is a view of the right end of the same. Fig. 4 is an inside end view of one of the end members. Fig. 5 is a similar view of the middle member. Fig. 6 is a side elevation of the middle member. Fig. 7 is a sectional view of the end member shown in Fig. 4 on the line $x$ $x$ in the said figure. Fig. 8 is a side elevation of the left ring of the middle member. Fig. 9 is a view of the outer end of the same. Fig. 10 is a view of the inner end of the same. Fig. 11 is a side elevation of the right ring of the middle member. Fig. 12 is a view of the outer end of the same. Fig. 13 is a view of the inner end of the same. Fig. 14 is a plan view of the hub portion of the middle member. Fig. 15 is a side elevation of the same. Fig. 16 is an end view of the same. Fig. 17 is a sectional view on the line $y$ $y$ of Fig. 2 on an enlarged scale. Fig. 18 is a similar view of a modification of my differential coupling device. Fig. 19 is a similar view of another modification of the same.

My differential coupling device comprises a middle member A and a pair of end members B, one on each side of the said middle member, one or more sets of coupling devices C comprising each a raceway H in which is operatively housed a set of balls D and suitable supporting means, such as a shaft E, which is provided with proper bearings, which latter are not shown.

The end members B may in some cases differ slightly in exterior form to suit special conditions, as for instance, as shown in Fig. 1, the left end member B has a hub portion 20 provided with a groove 21 suitable for receiving a belt. In this case the said left end member B is loosely mounted on the shaft E and the hub 20 of the right end member B is rigidly connected to the said shaft E as by means of a set screw 22, and the shaft E is provided with a collar 23 adjacent the hub 20 of the left end member B. In interior structure the two end members B are similar. As shown the said end members B comprise each the hub portion 20 having an axial bore 26 fitting the shaft E and a flange portion 24 at the inner end 25 thereof. The said inner end 25 is provided with a series of notches or seats 27 of approximately semi-spherical formation and fitting the balls D and arranged in a circle at an appreciable distance from the shaft E and concentric therewith. The said notches 27 are interrupted at approximately the middle portion thereof by an annular groove 28 of a width appreciably less than the diameter of the balls D and the notches 27 and extending axially into the body of the flange portion 24 slightly beyond the axial depth of the said notches 27.

The middle member A comprises a hub portion I having a body portion 56 provided with an axial hole 30 fitting the shaft E, having radial end faces 31 provided each with an axially extending annular tongue 32 that is a loose fit in the annular recess 28 in the end member B. The outer periphery 33 of the central body portion 56 is finished off suitably to receive the ring members F and G, the said outer periphery 33 as shown being spherical. The said outer periphery 33 is provided at intervals corresponding in number to the number of coupling devices C with grooves 34 constituting each the inner portion of a raceway H, which groove 34 is positioned concentric with a radius in the median plane of the said hub portion I and is of such diameter that when the balls D are positioned therein a portion of the balls at the lateral ends of the raceway H will be exposed beyond the end faces 31. The annular tongue 32 overhangs the balls D at the lateral ends and is cut away on the side of the balls D as shown at 35 leaving an outer portion 36 intact that serves as a ball retainer at the said lateral ends. The said middle member A comprises further a ring member J which is of annular formation and incloses the body portion 56 of the hub member I and is rigidly secured thereto in in any suitable manner. As the outer periphery 33 of the hub portion I is spherical in shape the said ring member J is divided along the median radial plane and is composed of the left ring F and the right ring G. As shown, the rings F and G are provided on the abutting faces with an annular overlapping joint 37. Furthermore, as shown, the left ring F is secured to the hub portion I by radial screws 38 and the right ring G is secured to the left ring by means of axially extending screws that pass through the holes 39 in the left ring F and are received in holes 40 in the right ring G.

When the middle member A and the end members B are mounted on the shaft E as shown in Figs. 1 and 17 part of the notches 27 are in registration with the balls D as exposed in the raceway C and engage therewith both above and below the retaining portion 36 of the tongue 32. Accordingly, when rotary motion is given to one of the end members B, as to the left end member B by a belt applied to the left portion 20 thereof, the balls D are moved in the raceway H by the notches 27 of the left end member B engaged therewith, in case they are free to do so. In such case, by holding the middle member A stationary a rotary movement is imparted to the right end member B through the medium of the balls D and in a direction reverse to the direction of movement or rotation of the left member B, and as the right end member B is rigidly secured to the shaft E a rotary movement will be given to the shaft in reverse direction to the movement of the left end member B.

The arrangement described is suitable for special uses for obtaining a reverse movement, and particularly as shown, when the device proper is mounted on a continuous shaft.

In the modification shown in Figs. 18 and 19 the shaft is divided and the internal structure is changed accordingly.

In the modification shown in Fig. 18 the end members $B^1$ are similar and comprise each an axial hole having a cylindrical portion 41 at the outer end and a square portion 42 at the inner end. The hub portion $I^1$ of the middle member $A^1$ has a cylindrical axial bore 43 that is reduced in diameter relatively to the cylindrical and squared portions 41 and 42, of the hole in the end member $B^1$. The shaft $E^1$ is divided, the shaft ends being formed similarly and abutting in the middle and comprise each a cylindrical body portion 44, squared portion 45, and reduced cylindrical portion 46 at the inner or tip end and which fit respectively the cylindrical and squared portions 41 and 42, of the end members $B^1$ and the reduced bore 43 of the hub portion $I^1$. In this style the middle member $A^1$ is operatively housed on the shaft tip ends 46 and the end members $B^1$ are non-rotatively secured on the shaft portions $E^1$. In this style, as in the style shown in Fig. 19, a two part housing is provided comprising a shell member L that fits over one end and the body portion of the combined middle member $A^1$ and end members $B^1$ and is closed at the open end by a cover M, and which are provided with bearings 47 that engage with the outer ends of the end members $B^1$ and prevent longitudinal separation thereof.

In the modification shown in Fig. 19 the end members $B^2$ are provided at the outer end with a square axial socket 57 that is a fit for the square end 48 of the shaft portion $E^2$ and at the inner end there is an axial extension 49 that is a fit for the reduced bore 43 of the hub portion $I^1$ of the middle member $A^1$ and extends to the middle portion thereof in abutment with the mating extension 49 of the other shaft portion $E^2$.

As stated, in the modifications shown in Figs. 18 and 19 the shafts $E^1$ and $E^2$ are divided and the end members are non-rotatively mounted on the shaft portions. Accordingly a rotative movement applied to one shaft portion will effect a reverse rotative movement of the other shaft portion in case the middle portion $A^1$ is held against rotation, and these devices are accordingly suitable for use as reversing elements for effecting such reverse movements of the shaft portions, as in reversing gears.

My device as described, particularly the modifications shown in Figs. 18 and 19 is suitable for use as a differential. In such case the middle member $A^1$ is driven by the power and to enable this to be done may be provided with a groove or cylindrical face for a belt or with a set of gear teeth on the periphery and power is transmitted to the end members $B^1$ or $B^2$ by means of the coupling devices C. When the resistance is equal on the said end members the balls D engaged with the notches or seats 27 coöperate therewith virtually like interlocked gear teeth and serve to couple the middle member $A^1$ and the shaft ends $E^1$ and $E^2$. In case however there is unequal resistance on the two shaft ends and the end members mounted thereon there would result an unbalanced condition with respect to the balls D with the result that they will be propelled in the raceway until a condition of equilibrium or balancing is attained and which unbalanced condition permits of a greater movement of the one shaft end relatively to the other shaft end.

The coupling device C comprises essentially a ball bearing of peculiar construction. In some cases the balls D may be replaced by rolls as is sometimes done in the case of ordinary bearings.

My differential coupling device as described constitutes virtually a mechanical movement and is suitable for various uses.

As a reversing element of a coupling device the same may be used in the transmission gearing for motor boats and in tapping or other chucks for machine tools or for shafting and as a differential a most important use for the same would be in automobiles as well as in other situations where a differential may be required.

Changes in details other than those shown may be made in various ways in using my invention. For instance, the middle member A¹ may be made solid in case a plurality of coupling devices C are used and the same may be supported in a floating condition by the said coupling devices C. I prefer however to have the said middle member positively supported in some such way as shown or in a manner equivalent thereto. Also, the spherical feature of the periphery of the hub member may be omitted and the said periphery be made cylindrical.

As regards the floating condition mentioned for the middle member A¹, this condition would be attained in the modification shown in Fig. 18 by simply omitting the shaft ends 46 shown in the said figure and referred to as the reduced cylindrical portion and in the modification shown in Fig. 19 by omitting the axial extensions 49 shown in the said figure. Whether or not the interior portion of the middle member vacated by the omission of the parts mentioned is filled or made solid is immaterial.

No other change then that indicated is necessary for successful operation, it being understood that the condition described is admissible only with a plurality of coupling devices, so that the middle member is supported on all sides.

As regards the substitution of the cylindrical form for the spherical form of the periphery of the hub member, it will be noted that the function of the spherical form is to coöperate with the holding screws to hold the wings F and G in position and when the spherical formation is dispensed with the screws are relied upon entirely for such holding.

I claim as my invention:—

1. A mechanical movement comprising a pair of end members, rotatively mounted, and having each a series of notches and a middle member positioned between the said end members, and provided with a raceway, a set of balls in the said raceway and engaged with the said notches, and serving as means for interconnecting the said end members, and the said end members having their axes in alinement.

2. A differential coupling device comprising a middle member rotatively mounted, a pair of end members, the said middle member provided with a raceway in a plane in parallelism with the axis, balls in the said raceway, said balls at the lateral ends of the said raceway exposed beyond the end faces of the said middle member, and the said end members provided each with a set of notches arranged concentric with the said axis and suitable for engaging with the said balls at the lateral ends of the said raceway, and a retaining device on the ends of the said middle member and serving to retain the said balls in the raceway.

3. A differential coupling device comprising a middle member and a pair of end members, a coupling device operatively interconnecting the said end members and comprising a set of balls and a raceway therefor, and a portion of the said balls being exposed beyond the lateral end faces of the said middle member, means attached to the said middle member for retaining the said balls in the said raceway.

4. A differential coupling device comprising a middle member and a pair of end members rotatively mounted, the said end members provided each with a set of notches arranged concentric with the axis, the said middle member comprising a hub portion, a raceway on the outer periphery of the said hub portion concentric with a radius, balls in the said raceway, and means for retaining the said balls in the said raceway.

5. A differential coupling device comprising a middle member and a pair of end members rotatively mounted, the said end members provided each with a set of notches arranged concentric with the axis, the said middle member comprising a hub portion having a raceway on the outer periphery concentric with a radius, balls in the said raceway, and means for housing the said balls in the said raceway, said means comprising a ring portion positioned exterior to the said hub portion.

6. A differential coupling device comprising a middle member and a pair of end members rotatively mounted, the said end members provided each with a set of notches arranged concentric with the axis, the said middle member comprising a hub portion, a raceway on the outer periphery of the said hub portion concentric with a radius, balls in the said raceway, and means for housing the said balls in the said raceway, the periphery of the said hub portion being spherical and the said means comprising a two part ring portion fitting the said periphery.

7. A differential coupling device comprising a middle member and a pair of end members rotatively mounted, the said end members provided each with a set of notches concentric with the axis, the said middle member comprising a raceway extending across the body portion, balls in the said raceway and a portion thereof exposed at the lateral end faces of the said middle member, the said notches fitting the said balls, ball retaining means extending from the said end faces and inclosing the said balls, and the said end members provided with a groove concentric with the said notches for operatively housing the said ball retaining means.

8. A differential coupling device comprising a middle member and a pair of end members rotatively mounted, the said middle member provided with a raceway extending across the body portion, balls in the said raceway and exposed at the ends of the said middle member, ball retaining means at the said ends, the said ball retaining means positioned adjacent the middle portion of the said balls, means on the said end members for receiving the said ball retaining means and other means for engaging with the said balls that are exposed at the said ends.

9. A differential coupling device comprising a middle member and a pair of end members rotatively mounted, the said middle member provided with a raceway extending across the body portion, balls in the said raceway and exposed at the ends of the said middle member, ball retaining means at the said ends, the said ball retaining means positioned adjacent the middle portion of the said balls, means on the said end members for receiving the said ball retaining means and other means for engaging with the said balls that are exposed at the said ends, and the said latter means operative to engage the said balls both above and below the said ball retaining means.

JOSEPH H. DEMING.

Witnesses:
BERTRAND E. SPENCER,
LOUIS M. SCHMIDT.